(12) United States Patent
Baey et al.

(10) Patent No.: US 7,724,699 B2
(45) Date of Patent: May 25, 2010

(54) ADAPTIVE RATE MATCHING METHOD

(75) Inventors: Sébastien Baey, Paris (FR); Marcel Dumas, Orsay (FR); Marie-Claude Dumas, Orsay (FR); Ascension Vizinho, Versailles (FR)

(73) Assignee: NXP B.V., Eindhoven (NL)

( * ) Notice: Subject to any disclaimer, the term of this patent is extended or adjusted under 35 U.S.C. 154(b) by 1009 days.

(21) Appl. No.: 10/518,824

(22) PCT Filed: Jun. 18, 2003

(86) PCT No.: PCT/IB03/02780

§ 371 (c)(1),
(2), (4) Date: Dec. 21, 2004

(87) PCT Pub. No.: WO2004/004174

PCT Pub. Date: Jan. 8, 2004

(65) Prior Publication Data
US 2005/0220047 A1   Oct. 6, 2005

(30) Foreign Application Priority Data

Jun. 28, 2002   (EP)   ................................. 02291620

(51) Int. Cl.
*H04W 4/00*   (2009.01)
(52) U.S. Cl. .................................................... 370/328
(58) Field of Classification Search ................ 370/318, 370/328, 141, 280, 252, 229–236, 322, 347, 370/228; 455/127.1, 450, 522; 375/141
See application file for complete search history.

(56) References Cited

U.S. PATENT DOCUMENTS 6,788,657 B1 *   9/2004   Freiberg et al. ............. 370/328

2002/0012383 A1 *   1/2002   Higuchi et al. .............. 375/141
2002/0115443 A1 *   8/2002   Freiberg et al. ............. 455/450
2002/0163455 A1 *   11/2002   Reefman et al. ............. 341/143

(Continued)

FOREIGN PATENT DOCUMENTS

EP   1 047 219 A1   10/2000

(Continued)

OTHER PUBLICATIONS

"On the Capacity of a Cellular CDMA System" Gilhousen et al. IEEE Transactions on Vehicular Technology, vol. 40, May 1991. pp. 303-312.

(Continued)

*Primary Examiner*—Kwang B Yao
*Assistant Examiner*—Andrew Lai

(57) ABSTRACT

The invention relates to a method, in a transmission system providing a set of multiplexed services transported on specific transport channels forming a single composite transport channel and having predetermined quality factors corresponding to required error rates which necessitate adequately adjusted individual transmission powers, for balancing the current individual transmission powers of said multiplexed services during a communication in order to satisfy the multiplexed service quality requirements while limiting the interference level. The method comprises a step of determining rate-matching coefficients enabling to balance the individual transmission powers of the multiplexed services with respect to the global transmission power on the composite transport channel, a step of transmitting, using said determined rate-matching coefficients and a step of adapting said rate-matching coefficients with respect to measured error rates of the multiplexed services on the specific transport channels.

13 Claims, 3 Drawing Sheets

U.S. PATENT DOCUMENTS

2003/0103469 A1* 6/2003 Setty et al. .................. 370/280
2004/0018849 A1* 1/2004 Schiff ......................... 455/522

FOREIGN PATENT DOCUMENTS

EP 1 069 798 A1 1/2001
EP 1 215 833 A1 6/2002
JP 2002-078024 A 3/2002

OTHER PUBLICATIONS

"Tree-structured generation of orthogonal spreading codes with different lengths for forward link of DS-CDMA mobile ratio" Adachi et al., Electronics letters, Jan. 2, 1997, vol. 33 No. 1. pp. 27-28.
3GPP Technical Specification 25.302, pp. 1-52.
3GPP Technical Specification 25.212, pp. 1-61.

* cited by examiner

ADAPTIVE RATE MATCHING METHOD

FIELD OF THE INVENTION

The invention generally relates to digital transmission systems. In particular it relates to a method of resource optimization in a transmission system for transmitting simultaneously from the same emitting entity at a global transmission power a set of various multiplexed services having specific predetermined error rate requirements that are satisfied through adjusting and balancing individual transmission powers.

The invention particularly applies to 3G ($3^{rd}$ Generation) wireless and radio mobile systems, such as the UMTS (Universal Mobile Telecommunications System) multi-service system.

BACKGROUND OF THE INVENTION

The UMTS mobile radio system allows to multiplex on the radio interface various simultaneous services having various Quality of Service (QoS) requirements and bit rates, such as e.g. voice, video, circuit-switched data and packet-switched data services. The mobile physical layer has been designed to support such service diversity and to provide the required QoS. This QoS is obtained by applying a specific modulation and coding scheme. It can be measured in terms of Bit Error Rate (BER) or Block Error Rate (BLER). For example, a speech or voice service generally requires a BER of $10^{-3}$, while a video service would require a BER of $10^{-6}$. For each service considered the quality of transmission is measured on reception by a BER or BLER. This BER or BLER is tied to a ratio of Energy per bit over spectral density of Noise ($E_b/N_0$) and adjustment of individual transmission power corresponding to this service is a means to influence this $E_b/N_0$ ratio. In the context of the invention, all services are multiplexed on a same common Coded Composite Transport CHannel (CCTrCH) having a global transmission power. The reception quality of the CCTrCH is measured on reception by a global quality factor defined as a ratio of Energy per symbol over spectral density of Noise ($E_s/N_0$), which is a combination of all individual quality factors ($E_b/N_0$ ratios). Therefore, adjusting the global transmission power and obtaining an $E_s/N_0$ on reception, that is optimal for all services becomes a difficult task when multiplexing two or more services of different kinds. Moreover, obtaining too high an $E_s/N_0$ ratio on reception would waste radio resources and could cause saturation of the cell more rapidly while inefficiently wasting global transmission power of the emitting entity, e.g. mobile equipment, and increasing the interference level. Indeed in interference-dominated systems like Code-Division Multiple Access (CDMA) systems a radio resource is tied to the ratio between the useful received power from a given emitting entity to the sum of noise and interference powers. Resource optimization consists of optimizing the resource share of each user and its $E_s/N_0$ ratio on reception. Optimizing the $E_s/N_0$ ratio, and consequently global transmission power, requires readjustment of individual $E_b/N_0$ quality factors of the different services by means of optimal balancing of the associated individual transmission powers along with optimal adjustment of the global power. A specific procedure, known as the rate matching procedure, is described in the document by 3GPP (3rd Generation Partnership Project) referred to under number 3GPP Technical Specification 25.212, Multiplexing and: Channel Coding (FDD). It is meant to enable matching the sum of the coded bits data rates to the data rate of the common Coded Composite Transport Channel (CCTrCH) in uplink transmission on the one hand and to enable balancing the individual transmission power of multiplexed services on the CCTrCH on the other hand. Different techniques based on rate matching coefficients formed the basis of the 3GPP rate matching parameters determination algorithm described in the cited 3GPP Technical Specification 25.212. Such techniques are described, e.g. in European patent applications published under numbers EP 1 047 219 A1 and EP 1 069 798 A1. These RM coefficients are related to a number of bits to be repeated or punctured during transmission of a given service. In the algorithm presented in the cited 3GPP Technical Specification 25.212 and in the 3GPP Technical Specification 34.108, Common Test Environments for User Equipment Conformance Testing, the RM values are fixed by the UMTS Terrestrial Radio Access Network (UTRAN) as a semi-static factor, denoted RM, associated to the given services (see for instance typical configurations of the radio interface in 3GPP Technical Specification 34.108). Actually, these parameters do not depend only on the type of service, but also on the service conditions, including its current data rate and coding scheme for error protection, and on the transmission environment or noisy conditions. In the cited patent applications as well as in the 3GPP Technical Specification 25.212 and 3GPP Technical Specification 34.108, the values of the semi-static RM coefficients are predetermined and stored in a table, which cannot cope with the variability of real current environment and service conditions of the mobile equipment.

SUMMARY OF THE INVENTION

The invention aims at providing a radio resource optimization method for variable rate and QoS differentiated multi-service transmission systems. To this end, the invention provides a method for adjusting RM coefficients to the mobile conditions and for updating these coefficients with respect to changes in the mobile environment.

In accordance with the invention a method as defined in the opening paragraph is provided, including a step of balancing said current individual transmission powers with respect to an estimate, for a given service of a difference between said specific predetermined error rate requirement and a measured current error rate. This enables the transmission system to meet the specific predetermined error rate requirements by adapting selectively the transmission powers of the services in accordance with their measured error rates, in order to limit as far as possible an increase of the global transmission power, which would be disadvantageous with respect to resource management.

There is also provided, in a transmission system for transmitting simultaneously at a global transmission power a set of various multiplexed services comprising transport data blocks of predetermined sizes for transporting block-coded data on specific transport channels having specific predetermined error rate requirements depending on their current individual transmission powers, a method of resource optimization including a step of dynamically balancing said current individual transmission powers with respect to the predetermined sizes of said transport data blocks. Actually, the sizes of the transport data blocks notably influence the channel coding performance on the blocks. The larger the size of the block, the more efficient the channel coding on this block is. As a consequence, the BER/BLER caused by large blocks is lower and thus better than the one caused by smaller blocks. This phenomenon, called code block size coding gain, is taken into account in the invention, for optimally balancing the transmission powers with respect to the sizes of the blocks, which are transported on the transport channels. This means that optimal rate-matching parameters, which enable to balance the transmission powers on each transport channel, may change for each different transport format combination with respect to their different transport block set sizes.

BRIEF DESCRIPTION OF THE DRAWINGS

The invention and additional features, which may be optionally used to implement the invention to advantage, are apparent from and will be elucidated with reference to the drawings described hereinafter.

DETAILED DESCRIPTION OF THE DRAWINGS

Figure 1:
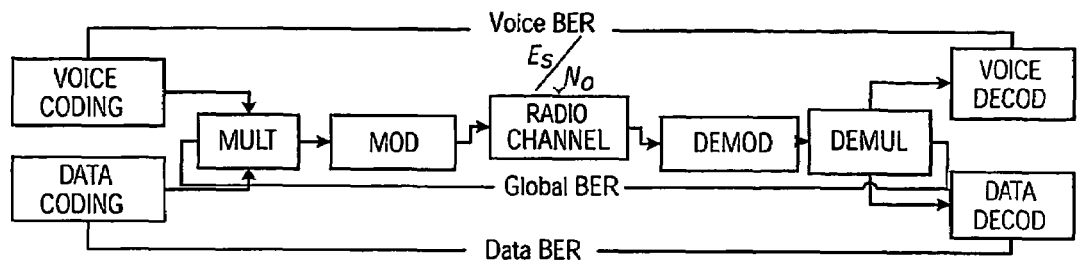
FIG. 1 is a conceptual block diagram illustrating an example of a transmission system wherein the invention is applicable.

FIG. 1 shows the standard physical process chain in UMTS uplink transmissions, involving transport channel processing and modulation. For simplification purpose, only two multiplexed services are represented in FIG. 1: voice and data services. These two services differ on the error protection scheme due to their different data rate and quality of service (QoS) requirements. Actually, the QoS is obtained by applying an appropriate coding scheme, which can be measured by the Bit Error Rate (BER) or the Block Error Rate (BLER) on reception. For example, the speech or voice service requires a BER of $10^{-3}$, while the data service requires a BER of at least $10^{-6}$. The error protection is carried out in the physical layer and is compliant with 3GPP Technical Specifications 25.212.

The voice and data coding includes CRC attachment, convolutional and turbo coding for the voice and data services respectively, 1st interleaving (also known as inter-frame interleaving) and rate matching. Voice and data services come from two distinct individual transport channels or TrCH. A VOICE CODING bloc and a DATA CODING bloc are used to separately code the voice and data services, respectively, using appropriate coding schemes. Both individual transport channels are then multiplexed and interleaved to form a one-flow of data stream by a multiplexing and $2^{nd}$ interleaver unit denoted MULT. A modulation unit, denoted MOD, is used to prepare the multiplexed flow to be sent on the air interface. Neither spreading, nor scrambling processes are represented on FIG. 1. The right part of FIG. 1 shows the subsequent process at the reception end. It comprises demodulation DEMOD, $2^{nd}$ de-interleaving and demultiplexing DEMUL to retrieve the voice and data services after a voice decoding VOICE DECOD and a data decoding DATA DECOD, respectively.

Figure 2:
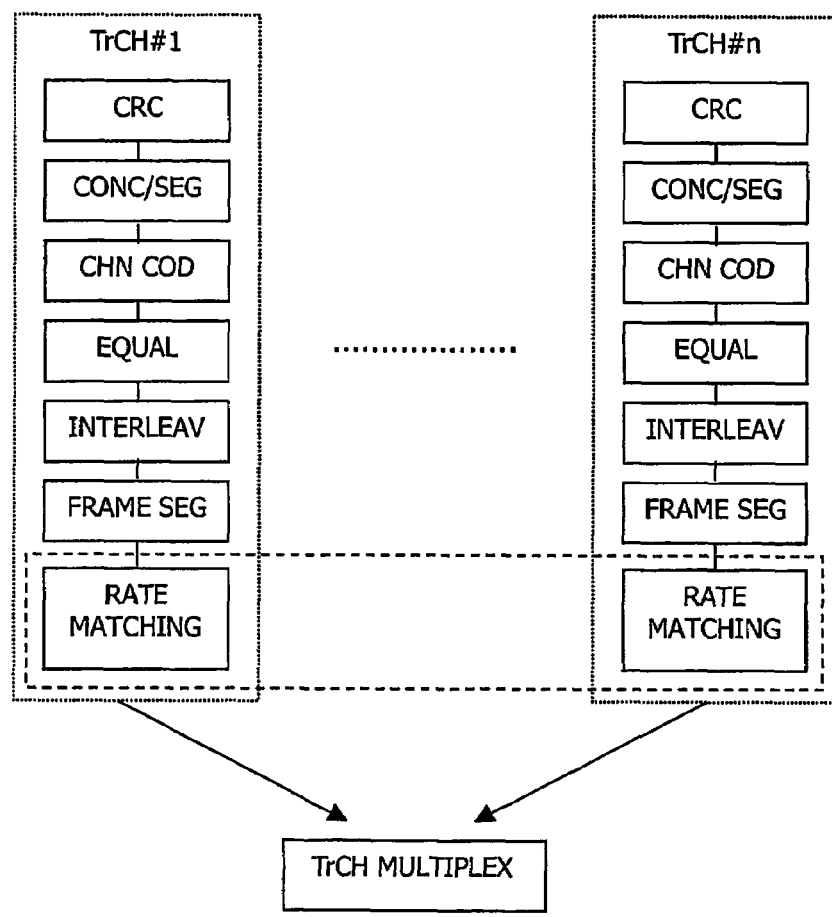
FIG. 2 is a conceptual block diagram illustrating in greater detail a part of the transmission system illustrated in FIG. 1, FIG. 3a and FIG. 3b are graphs illustrating steps of a method according to a preferred embodiment of the invention.

FIG. 2 shows in greater detail the data processing and multiplexing chain used in the physical layer for uplink transmissions, as described in the cited 3GPP Technical Specification 25.212. Information bits are exchanged periodically with layer 2 on each TrCH by means of transport blocks (MAC SDUs) at the beginning of each Transmission Time Interval (TTIX) as described in 3GPP Technical Specification 25.302, Services Provided by the Physical Layer. The first physical layer operation on transport blocks consists of the addition of a frame check sequence which will be used on reception to detect residual errors in transport blocks after channel decoding. The blocks referenced on FIG. 2 are indicated in the text with acronyms between brackets. After CRC attachment (CRC), transport blocks are serially concatenated (CONC/SEG) providing the channel coder with bigger code block size. The next operation is channel coding (CHN COD). For reason of mobile implementation complexity, only four coding options have been retained to provide the targeted BER or BLER: rate ½ or ⅓ convolutional coding, rate ⅓ turbo coding or no coding. Segmentation into smaller equally sized code blocks is performed before channel encoding whenever the output of the transport concatenation unit size is bigger than a channel coder specific limit (504 bits for convolutional coding and 5114 bits for turbo coding). This limitation on code block size was specified as a result of the underlying decoding complexity/performance tradeoff.

Five operations are then sequentially realized in the transport sublayer in order to make the coded blocks of multiple concurrent service flows mappable in the recurrent 10 ms radio frame. The first four operations are performed concurrently on each individual TrCH: radio frame size equalization (EQUAL), inter-frame interleaving (INTERLEAV), radio frame segmentation (FRAME SEG) and rate matching (RATE MATCHING). The fifth operation is the multiplexing of the concurrent flows on a unique coded composite transport channel CCTrCH (TrCH MULTIPLEX).

Radio frame size equalization is performed after channel coding. This operation consists of slightly adjusting the coded block size of each service flow, padding with dummy bits in order to ensure that the coded block size is a multiple of the number $F_i$ of radio frames it is intended to be transmitted over ($F_i$=1, 2, 4 or 8 corresponding to TTI=10, 20, 40 or 80 ms).

Inter-frame interleaving then consists of serially writing the coded sequence in the rows of an $F_i$-columns block interleaver, performing column permutations and serially reading the resulting table of bits column by column. Interleaved blocks are then serially segmented into $F_i$ equally sized blocks for transmission on consecutive radio frames, one by one. After radio frame segmentation all physical layer operations are performed on a radio frame basis, serially processing each of the output blocks of data.

Rate matching mechanism follows. It is a two-fold process by which the sum of the instantaneous bit rates over all TrCHs is adapted to the discrete on-line bit rate of the WCDMA sub-layer using repetition or puncturing. Every ten milliseconds the rate matched outputs of all the TrCHs are then time multiplexed with serial concatenation to form a single block transmitted in ten milliseconds on a single CCTrCH.

Data blocks are then treated by the WCDMA sub-layer (not represented on FIG. 2). In the usual case where the bit rate of the mobile's uplink coded composite flow does not exceed 960 kbps (usually corresponding to the well known 384 kbps service rate at physical layer service interface), the CCTrCH is mapped on a single physical channel. In case a higher bit rate is necessary multi-code transmission is used. Equally sized physical data blocks to be transmitted one per physical channel are hence produced by the serial segmentation unit.

Intra-frame interleaving is then performed on each of these physical data blocks with the aim to further randomize transmission errors over the multiplexed TrCHs and in a 10 ms time window.

The flexibility offered by the physical layer through its reconfiguration possibilities is driven by appropriately setting the configuration according to the quality of transmission required on every TrCH. All of the physical layer operations are entirely parameterized by the CRC size, the type of coding, the transmission time interval and a rate-matching attribute. These quality-related parameters are gathered in the semi-static part of the transport formats associated to a TrCH. This part is identical for all transport formats associated to a TrCH. Semi-static parameters are used to pre-configure the physical layer for transmission upon establishment of a call/session.

Transport formats also include a dynamic part: the transport block size and the transport block set size. The transport block size is the size in bits of a transport block. Since all transport blocks inside a transport block set have the same size, the transport block set size is simply the transport block size times the number of transport blocks of a given transport format. For a TrCH, it is actually the dynamic part that can change on a TTI basis, selected at the start of every TTI by the MAC sub-layer. The set of transport formats of every TrCH is built according to the service requirements and signaled to the mobile by the network upon establishment of a call/session.

The mobile simultaneously uses one specific transport format (semi-static and dynamic parts) on each of its n TrCHs in every radio frame. These transport formats constitute a transport format combination (TFC), signaled to the base station through a transport format combination indicator (TFCI) bit field. On reception, the base station performs reverse physical layer operations. The only periodic knowledge of the TFCI value is sufficient to dynamically configure the receiver on a radio frame basis.

Rate matching holds a key role for differentiating the quality of transmission of the multiplexed services. The following paragraph analyses this fundamental feature of the UMTS FDD physical layer. WCDMA technology highly relies on the efficiency of the power control mechanism to guarantee a sufficient quality level on the provided physical control and data channels as described in the article by K. S. Gihousen et al.: "On the Capacity of a Cellular CDMA System" published in IEEE transactions on Vehicular Technology, vol. 40, n.degree.2, pages 303-312, May 1991. For power control implementation simplicity, accuracy and robustness, a single mobile-specific Signal to Interference Ratio (SIR) target and hence a single quality user data stream (CCTrCH) is provided for each mobile in the uplink of the UMTS. Therefore, all the CCTrCH bits are received with a unique $E_s/N_0$ ratio of energy over spectral noise density (including interference), from which the differentiated quality objectives of each TrCH are obtained. Moreover, in the uplink continuous transmission is used for reasons of efficient and linear power amplifier operations and battery-life saving. Besides, power pulsing could induce audible interference to neighboring radio electric equipment and even to the terminal itself. Hence with continuous transmission, the CCTrCH bit rate $R_s$ is to match the bit rate offered by the WCDMA sub-layer. Since WCDMA technology and in particular the use of Orthogonal Variable Spreading Factor codes implies the use of a discrete on-line physical bit rate function of the selected spreading factor as mentioned in the article by F. Adachi et al.: "Three-structured Generation of Orthogonal Spreading Codes with Different Lengths for Forward Link of DS-CDMA Mobile", published in Electronic Letters, vol. 33, no. 1, pages 27-28, 2 Jan. 1997, the CCTrCH allowed bit rates are discrete. Besides, it is variable on a frame-by-frame basis to accommodate variable bit rate services. Therefore the upper part of the physical layer is to make use of the discrete bit rate $R_s$ and unique $E_s/N_0$ offered by the WCDMA interface through the CCTrCH. On each TrCH a specific BER or BLER 1 is to be reached and maintained through the course of the call/session using an appropriate transport format semi-static part (CRC size, coding type, interleaving depth and RM attribute) regardless of the instantaneous bit rate conveyed. Rate matching is the mechanism used to realize the necessary rate adaptation (by repetition or puncturing) between the TrCHs and the CCTrCH. Fine QoS balancing is simultaneously obtained by unequal repetition or puncturing as a means to tune the required $E_b/N_0$ of each TrCH, minimizing the mobile transmission power requirement.

Let us denote by $N_{i,j}$ the number of bits of TrCH i to be transmitted in a radio frame (after radio frame segmentation) when using transport format combination j, $\Delta N_{i,j}$ the corresponding amount of bits to be repeated or punctured in the rate matching process, $(E_c/N_0)_i$ the ratio of energy per coded bit over spectral density of noise (including interference) at TrCH i decoder input after de-rate matching and $N_{data,j}$ the number of bits in a radio frame that will be used to convey the TrCH data flows on CCTrCH. The following set of (n+1) equations then results from writing the user bit energy conservation through rate matching process and summing the multiplexed channels bits:

$$\frac{N_{i,j} + \Delta N_{i,j}}{N_{i,j}} = \frac{(E_c/N_0)_i}{E_s/N_0} \text{ for all } i = 1 \ldots n \text{ and} \quad (1)$$

$$\sum_{i=1}^{n} (N_{i,j} + \Delta N_{i,j}) = N_{data,j} \quad (2)$$

This set of (n+1) equations is equivalent to $$\frac{N_{i,j} + \Delta N_{i,j}}{N_{i,j}} = \frac{N_{data,j} \times (E_c/N_0)_i}{\sum_{i=1}^{n} (N_{i,j} \times (E_c/N_0)_i)} \text{ for all } i = 1 \ldots n \text{ and} \quad (3)$$

$$\sum_{i=1}^{n} (N_{i,j} \times (E_c/N_0)_i) = N_{data,j} \times E_s/N_0. \quad (4)$$

Introducing for each transport channel i a rate matching attribute representative of its quality requirement, $RM_i = \alpha \times (E_c/N_0)_i$ with $\alpha$ real coefficient independent of the transport channel, the above set of (n+1) equations is now equivalent to $$\frac{N_{i,j} + \Delta N_{i,j}}{N_{i,j}} = \frac{N_{data,j} \times RM_i}{\sum_{i=1}^{n} (N_{i,j} \times RM_i)} \text{ for all } i = 1 \ldots n \text{ and} \quad (5)$$

$$\sum_{i=1}^{n} (N_{i,j} \times (E_c/N_0)_i) = N_{data,j} \times E_s/N_o. \quad (6)$$

Two steps are performed for every radio frame in the 3GPP uplink rate matching process. The first one, the rate matching parameters determination algorithm, is global and entirely parameterized by the instantaneous bit rates of the different TrCHs (i.e. $N_{i,j}/10$ ms) and the relative quality requirement of every TrCH compared to any other TrCH of the multiplex. It consists of determining the instantaneous physical bit rate that will be necessary to convey the TrCH data flows (or equivalent $N_{data,j}$) and the amount of spreading bits to be repeated or punctured among the multiplexed TrCHs, i.e. $\Delta N_{i,j}$ for all i=1 . . . n. In a second step the exact repeating or puncturing pattern is performed separately on each TrCH on the block of bits output of the radio frame segmentation. This predefined pattern is fully parameterized by the coding type and $\Delta N_{i,j}$ determined in the first step. The set of equations (5) constitutes the basis for the 3GPP rate matching parameters determination algorithm (3GPP Technical Specification 25.212, Multiplexing and Channel Coding). $\Delta N_{i,j}$ values are computed iteratively in accordance with equations (5). $RM_i$ values are chosen to be integer values ranging from 1 to 256 for easy signaling purposes. Rounding to the next lower integer is also used to compute the exact amount of bits to be repeated or punctured. This procedure guarantees that exactly the same results are found when the rate matching parameters determination algorithm is executed by any two different entities in the system, computation rounding inaccuracies being avoided.

The rules below gave birth to the first part of the 3GPP rate matching parameters determination algorithm which sets the spreading factor and number of physical data channels needed in every radio frame. These rules emanate from the necessary trade-off resulting from the impact of repetition/puncturing and multicode transmission on link level performances. In fact, $N_{data,j}$ is dynamically chosen such that:

1—It is among discrete values allowed by the network (through the specification of a minimum spreading factor) and compliant with the mobile capabilities,
2—Repetition is performed on all TrCHs when this does not require more than one physical data channel,
3—If more than one physical data channel would be required performing repetition on all TrCHs, puncturing is allowed in the aim of minimizing the number of physical data channels needed, provided a given puncturing limit is not bypassed on any TrCH.

Once $N_{data,j}$ has been selected, bit rates and BER/BLER requirements of TrCHs (related to $E_b/N_0$ requirements) translate into a discrete CCTrCH bit rate R, (i.e. $N_{data,j}/10$ ms) and a minimum $E_s/N_0$ requirement for its reception as shown by equation (6). Equation (5) shows besides that the rate matching ratio for transport channel i is clearly proportional to its $(E_c/N_0)_i$ requirement and normalized by a term, which ensures that the total volume of data to be multiplexed after rate matching is equal to the discrete value $N_{data,j}$. In this sense, rate matching can be interpreted as a semi-static operation, which ensures that the relative quality of each TrCH is maintained along the validity period of transport semi-static parameters and a dynamic operation which scales the total amount of data to the discrete value $N_{data,j}$ for every TFC j at the radio frame period.

QoS balancing between TrCHs is entirely parameterized by the relative quality requirement of every $TrCH^i$ compared to any other TrCH k of multiplex, i.e. $RM_i/RM_k$ parameter ratios obtained from $(E_c/N_0)_i/(E_c/N_0)_k$ ratios. Nevertheless $(E_c/N_0)_i$ requirement of each transport channel must be known to find a solution to equations (3) and (4) i.e. exact $\Delta N_{i,j}$ values and necessary $E_s/N_0$ value for CCTrCH reception. In the above calculus, each $(E_c/N_0)_i$ requirement value is dependent on global channel coding on each transport channel and environment (radio channel, mobile speed, . . . ). The minimization of the mobile transmission power requires an appropriate setting of $RM_i$ values. This will be discussed subsequently. The determination of the amount of bits to be repeated or punctured on each transport channel is performed dynamically by the mobile physical layer each time the volume of data to be transmitted in a radio frame varies, i.e. each time a TFC change occurs. The 3GPP rate matching algorithm was specified so that the amount of repetition/puncturing and the rate matching patterns can be easily reversed and exploited by the receiving entity at each radio frame (10 ms) knowing only the TFC used, as the whole process performed in the physical layer.

Now the invention will be discussed in detail. The RM coefficients determined by the UMTS Terrestrial Radio Access Network (UTRAN) are certainly not optimal during a whole mobile communication or for each mobile situation. As already mentioned, it is expected, in accordance with the invention that the rate matching process could advantageously take into account the radio channel (including the mobile environment and speed . . . ) in which the transmission is carried out and also the service flows variable data rates and associated code block size gain possibilities, with the aim to optimize the radio resource. It is the reason why two objects of invention are proposed, based on adaptive rate matching.

A first object of the invention is an RM adaptation loop method. This method is designed to converge towards optimal RM parameter values ensuring that quality target (BER or BLER value) is attained but not exceeded too much for any TrCH, thus optimizing system capacity, when considering power balancing between the TrCHs.

A second object of the invention is an RM parameters fine grain tuning method. This method is designed to take into account service flow variable data rates and associated code block size gain possibilities. This method introduces dynamic RM parameters, which may be applied at every radio Transmission Time Interval (TTI) for every Transport Format (TF) on every Transport Channel (TrCH) of every emitter, instead of semi-static RM parameters, which are described in the 3GPP Technical Specifications 25.302 and 25.212. This permits to support a very efficient packet mode on the radio interface operating at the level of every data block transferred in a radio frame, obtaining a resource gain in comparison to the existing standard method using semi-static rate matching parameters.

Both methods can advantageously be coupled for a powerful ARM method bringing an even better radio resource optimization as will be explained later.

The first object of the invention is described hereinafter. A simplified method for semi-static RM parameter assignment, not described in the 3GPP UMTS standards but compatible with them, could consist of determining the semi-static RM parameter values from performance curves BER=$f(E_b/N_0)$ or BLER=$h(E_b/N_0)$ ($E_b/N_0$=ratio of energy per information bit over spectral density of noise including interference at decoder input), for a supposed known environment and considering only the channel coding effect, i.e. neglecting the rate matching algebraic gain. In the following, a more efficient method is proposed and described.

The first object of the invention is to ensure through an adaptive process that the BER/BLER values required for each individual transport channel (TrCH) are attained rapidly and are not too much exceeded since this would degrade the system capacity. The environment conditions make it difficult to know the exact performance curves and to determine optimal RM parameters straightaway. Therefore, the invention provides an RM adaptation loop algorithm converging rapidly towards optimal RM parameter values ensuring that quality target (BER or BLER values) is attained but not too much exceeded for all TrCHs and TFCs, thus optimizing the system capacity. In accordance with the invention, optimal RM parameters would be those, which allow meeting the BER/BLER targets with the lowest possible global transmission power for a given TFC.

The proposed RM adaptation, loop method described below can be applied in a current User Equipment—UTRAN (UE—UTRAN) operation. This method is supported by a Rate Matching parameter optimization loop algorithm and applied to determine optimal RM parameters values to obtain BER or BLER values on each TrCH.

For every radio environment, channel coding performances relate the BER or BLER to the individual transport quality requirement of each service in terms of $E_c/N_0$ (ratio of energy per symbol over spectral density of noise, including interference, on reception at channel decoder input after de-rate matching) or $E_b/N_0$ (ratio of energy per information bit over spectral density of noise at reception after channel decoding).

Figure 4:
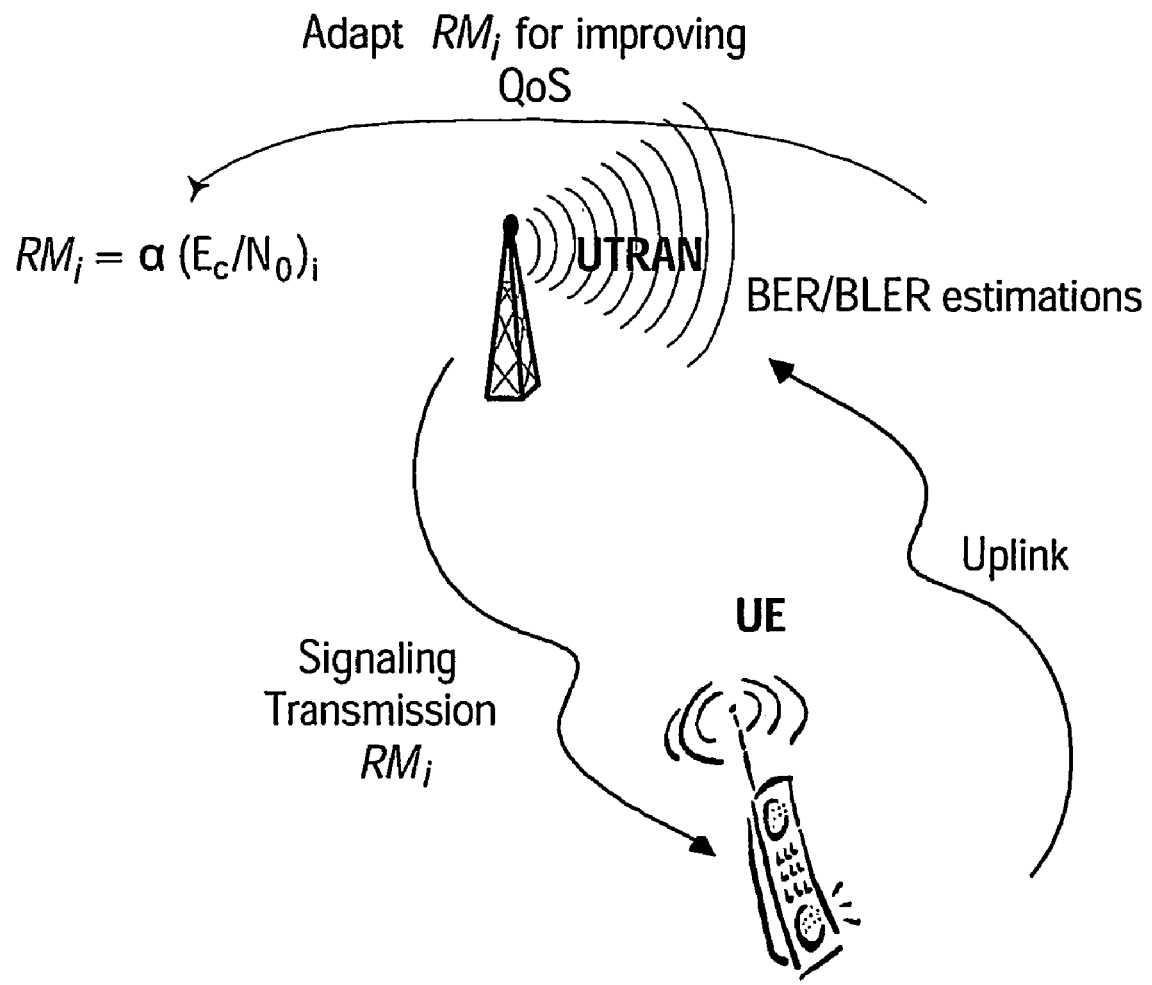
FIG. 4 is a diagram illustrating an example of a system and method according to the invention.

FIG. 4 roughly illustrates an example of scenario for adapting the RM coefficients, according to the invention. Besides the UMTS standard closed power control loops (inner and outer), a Rate Matching adaptation loop is added between the UTRAN and the user equipment (UE). In downink (DL) transmission, RM parameters are signaled to the mobile by UTRAN. Then, the physical layer applies them in the rate matching for uplink (UL) transmission. Finally, UTRAN can calculate the different service BERs or BLERs. If these errors are not satisfying the required QoS, then UTRAN can change the RM values in order to achieve the required BERs. On reception, UTRAN keeps on carrying out BER measurements and modifying the RM values if necessary. This process continues until the correct BERs are achieved.

Figure 3A:
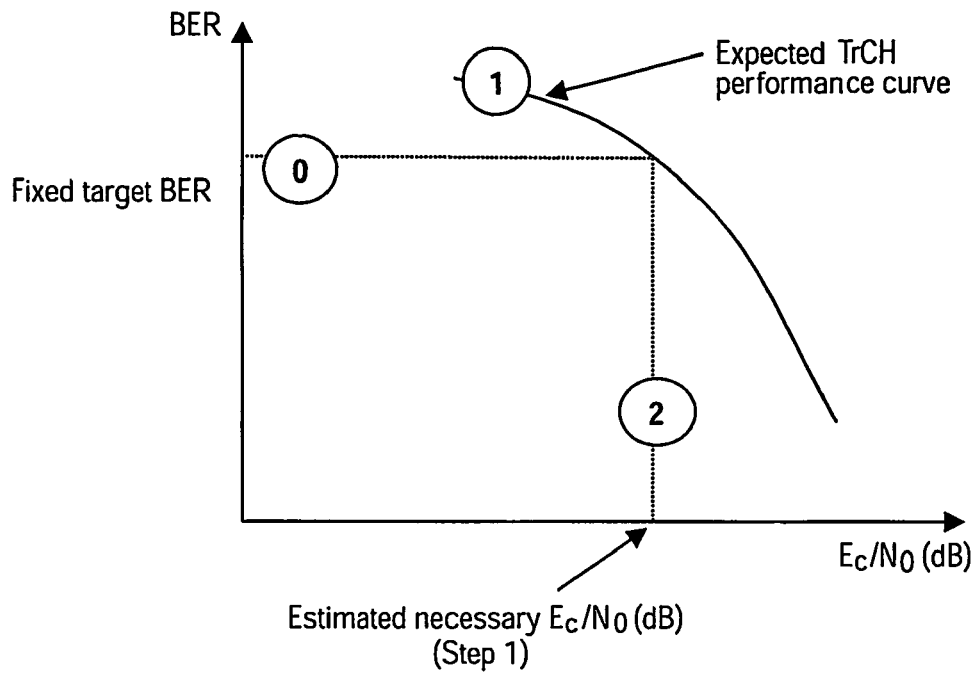
Figure 3B:
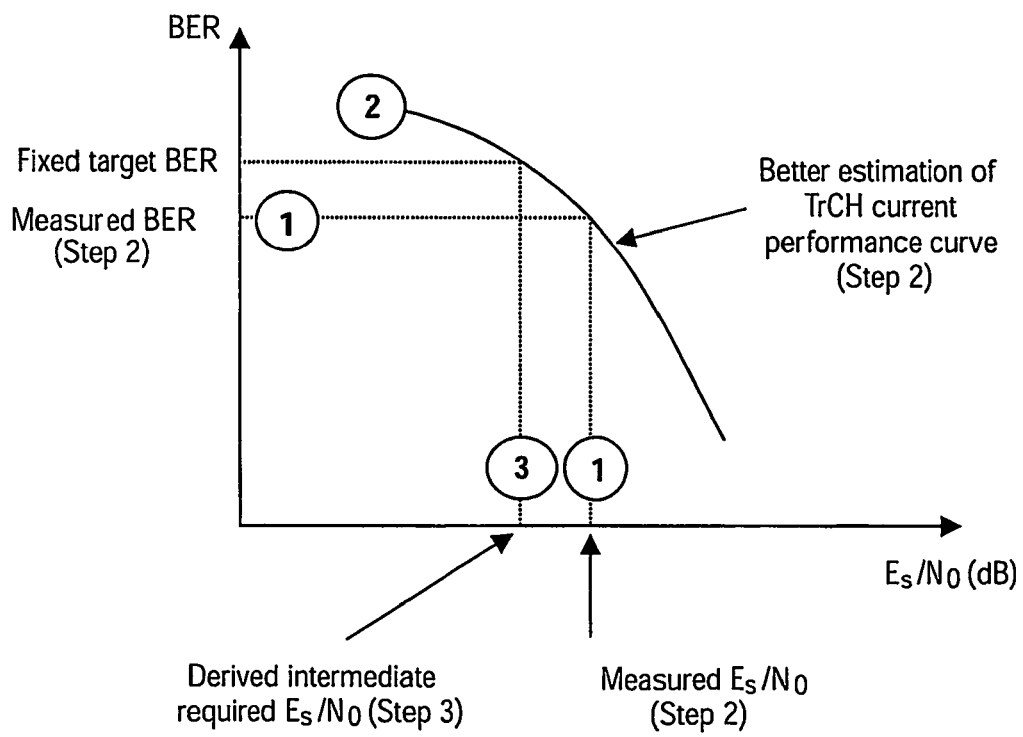

Two embodiments of the Rate Matching parameter optimization loop itself are proposed with reference to FIGS. 3 and 4. FIG. 3a and FIG. 3b illustrate in a first and preferred embodiment the execution of an algorithm to perform an adaptation of the RM parameters in a single loop in a current UE—UTRAN operation. Although the invention is particularly dedicated to uplink transmission, wherein the user equipment emits towards a base station, it can be applied to downlink transmission, where similar problems of quality of reception may occur. During uplink transmission, the user equipment is considered the emitting entity while the UTRAN is the receiving entity. During downlink transmission, it is the opposite. BER/BLER is used here as a representative of the quality requirement of a TrCH.

Step 1: On the receiving side, for each TrCH, estimate $E_c/N_0$ requirement from expected performance curve (see FIG. 3a), compute initial RM values (RM=$\alpha \times E_c/N_0$; $\alpha$ being a real coefficient identical for all TrCHs) and signal these values to the emitting entity.

Step 2: On the emitting side, transmit using last signaled RM values. During transmission, measure on receiving side actual BER/BLER performance on each TrCH and corresponding $E_s/N_0$ and derive a better estimate of the TrCH current performance curve (See FIG. 3b).

Step 3: On receiving side, for each TrCH, derive from Step 2 its intermediate $E_s/N_0$ requirement estimation and corresponding $E_c/N_0$ requirement for the desired BER/BLER through the current performance curve. The intermediate $E_s/N_0$ requirement estimation is the $E_s/N_0$ value that would be required for a TrCH to meet its quality requirement if its RM value is not modified.

Step 4 (Receiving side): If intermediate $E_s/N_0$ requirement estimation is different for any two TrCHs, adjust directly RM values on the basis of $E_c/N_0$ requirements (RM=$\alpha \times E_c/N_0$; $\alpha$ being a real coefficient identical for all TrCHs) computed in Step 3 for all TrCHs, signal these RM values to the emitting entity and use UMTS standard outer power control loop to adjust $E_s/N_0$ target according to formula (4). Go to step 2.

Step 5 (Reception side): If (most frequent case) all TrCHs have a BER/BLER very close to target at a common $E_s/N_0$ on CCTrCH, store optimal RM values and go to step 2.

FIG. 3a illustrates the execution of the initialization step (Step 1) of the algorithm for one of the multiplexed TrCHs. FIG. 3b illustrates the execution of steps 2 and 3 of the algorithm for one of the multiplexed TrCH. It should be noted that the RM adaptation loop algorithm is expected to perform an adaptation of the RM parameters in a single loop.

It is interesting to note that the performance curve in a given environment can be approximated by a straight line of fixed slope in a BER range, which does not exceed an order of magnitude, whatever the amount of repetition or puncturing used. Hence in real UE-UTRAN conditions where real time quality estimation on a TrCH provides with only one point of the performance curve, linear interpolation could be used at step 2 of the optimization loop algorithm to derive at step 3 the $E_c/N_0$ ratio at the required BER.

For Step 2, in case of channel variation, the current performance curve can be computed with the help of complementary measurements (e.g. mobile speed, etc. . . . ) and sophisticated estimation techniques for better channel quality prediction for each transmission time interval (TTI). With accurate performance curve estimation, the convergence of the RM adaptation loop could be reached in one cycle.

The RM adaptation loop algorithm can be used on a simulation platform to tune very finely the RM coefficients of a service multiplex in given channel conditions, in order to compensate the rate matching process impact on performances and perform more accurate QoS balancing. An example of a simulation algorithm is the following.

Step 1: For each TrCH, compute initial RM values corresponding to estimated $E_c/N_0$, rate-matching impact on performance not yet taken into account.

Step 2: Perform simulation with rate matching process taken into account.

Step 3: For each TrCH, deduce $E_c/N_0$ requirement and corresponding $E_s/N_0$ on CCTrCH.

Step 4: If required, $E_s/N_0$ is quite different for any two TrCHs, improve RM values on the basis of $E_c/N_0$ requirements of Step 3.

Step 5: If all TrCHs have BER or BLER very close to target at a common $E_s/N_0$ on CCTrCH, store optimal RM values and get out of the loop.

Step 6: Go to step 2.

FIG. 4 illustrates an uplink transmission, wherein the user equipment UE is the emitting entity and UTRAN is the receiving entity. In a second embodiment of the first object of the invention, an algorithm describing the different steps carried out on the UTRAN side and combined with the power control loop is described below.

Step 1: Signaling transmission. UTRAN proposes the RM values to the mobile, regarding mobile speed and environment.

Step 2: Uplink transmission. The mobile emits using the RM values proposed by UTRAN.

Step 3: Checking stage or adaptive stage. UTRAN verifies Bit/Block Error Rate for each service (TrCH) and gives a decision:

If the transmission of all services satisfies the requirements, then the RM values remain, and an adaptation of the global transmission power is realized, letting the known UMTS standard power control loop act on the $E_s/N_0$ target.

If the transmission of the n services does not satisfy the requirements, then the RM values have remained unchanged and the global transmission power is adapted, letting the known UMTS standard power control loop act on the $E_s/N_0$ target.

If the transmission of any number of services between 1 and (n−1) does not satisfy the requirements, then the RM parameters will be improved keeping the same $E_s/N_0$. Mathematically, this can be written as:

QoS partitioning:

$$\left\{\frac{E_c}{N_0}\right\}_{i \in n} = \left\{\frac{E_c}{N_0}\right\}_{k \in K} \cup \left\{\frac{E_c}{N_0}\right\}_{l \in L} \quad (7)$$

where n is the total number of services, K the acceptable services and L the non-acceptable services.

Increment,
for all $l \in L$ $$\left(\frac{E_c}{N_0}\right)_l \leftarrow \left(\frac{E_c}{N_0}\right)_l + h, h \in \mathbb{R} \quad (8)$$

Put $$\left\{\frac{E_c}{N_0}\right\}_{k \in K}$$

in ascending order of satisfaction and replace $$\left(\frac{E_c}{N_0}\right)_K \leftarrow \frac{1}{N_K}\left\{N_{data}\frac{E_s}{N_0} - \sum_{k=1}^{K-1} N_k\left(\frac{E_c}{N_0}\right)_k - \sum_{l=1}^{L} N_l\left(\frac{E_c}{N_0}\right)_k\right\} \quad (9)$$

Step 4: Go to step 2.

The second object of the invention will now be described in detail. It consists of the method described below to perform inter-TFC (Transport Format Combination according to the UMTS standard) quality balancing while dynamically minimizing resource consumption according to TFC choice. The proposed method is called RM parameters fine grain tuning method. The various multiplexed services comprise transport data blocks of predetermined sizes for transporting block-coded data on the specific transport channels (TrCHs). This method of fine grain resource optimization includes a step of balancing said current individual transmission powers with respect to the predetermined sizes of the transport data blocks. While the first object of the invention deals with an adaptive rate matching loop, the second object of the invention, which will be described more precisely afterwards, allows to instantaneously set dynamic RM parameters values closer to optimal values following a predefined rule at the TFC selection time period.

In accordance with a preferred embodiment, the step of balancing the current individual transmission powers includes a step of estimating the code block size coding gains related to the transport data blocks for deriving individual transmission powers, which match said specific predetermined error rate requirements. Coupled (or not) with the above RM adaptation loop (first object of the invention) this method provides an efficient support of variable rate flows with different code block sizes.

In the current 3GPP specifications, the RM coefficients are semi-static parameters. This means that there is only one value for each TrCH in use in user equipment whatever the TFC in use. A better use of RM coefficients is proposed, with a better and advantageous method in the context of variable rate multi-service flows with differentiated QoS, with substantial gain on $E_b/N_0$ requirement on each TrCH (and hence on overall capacity). This is achieved by performing optimal RM parameter tuning for each TFC.

This tuning method takes the following into account. In a given radio environment and considering several cases of fixed rate flows over given multiplexed transport channels, optimal RM values for each TFC in a given TFCS differ from one TFC to another. This is due to the influence of the dynamic part of the Transport Format (TF) on performances. In particular, when turbo coding is used on a TrCH, the size of the encoded block will impact the overall performance. Hence the $E_b/N_0$ requirement is less stringent when the size of the encoded block increases. The optimal tuning of each TFC will therefore require the use of one RM coefficient per TrCH and per TFC. The same remark also applies to convolutional codes though the dynamic of variation of convolutional coding code block sizes is smaller in the current version of the UMTS standard (maximum code block size is 504 when convolutional codes are used and 5114 when turbo coding is used).

A more optimal solution would necessitate the use of a specific RM parameter per TrCH and per TFC i.e. the RM parameter would become part of the dynamic part of the transport format like existing Transport Block Size and Transport Block Set Size. Two solutions are proposed for tuning the RM parameters. The first solution consists of adjusting these RM parameters as often as necessary through the course of the call/session according to an optimization loop like the one described in the first object of the invention and based on continuous quality measurements performed by UTRAN and subsequently signaling these RM parameters to the emitting entity. This solution induces rising computing and signaling cost. The second solution and preferred fine grain tuning method enables to reduce the signaling cost. It is also called the method of the "pre-defined rule", which is advantageously distributed between the emitting and the receiving sides and implies a local direct computation of most of dynamic RM parameters and a reduced signaling between the two entities.

TFCs in the TFCS having very close $E_b/N_0$ requirements are grouped. In each group, a TFC could be used as a reference regarding RM parameters, potentially corresponding with reference TFCs related to $\beta_d/\beta_c$ gain factors adjustment as described in the 3GPP Technical Specification 25.214, Physical Layer Procedures (FDD). The RM parameters of other TFCs in the group could be computed internally in the emitting side taking code block size and associated gain into account. A single and unequivocal rule should then be applied on the emitting side and the receiving side to set the RM parameters of every TFC in the group with reference to the reference TFC(s) for which RM parameters are signaled each time RM parameters of the reference TFC are modified. This solution is proposed to reduce the volume of signaling needed between the UTRAN and the UE and facilitates the RM parameters tuning. A judicious choice of TFC group sizes would set the necessary volume of signaling and the accuracy of the method. Using this alternative solution, RM parameters become dynamic parameters but are not necessarily signaled. A further advantage of this method is to allow adaptive RM parameter tuning by the UTRAN on the basis of measurement performed on all transport channels, continuously, whatever the TFC in use. Besides, scaling RM parameters of all TFCs with respect to one reference TFC guarantees to maintain an adequate and constant quality level on each TrCH whatever the TFC in use. Quality measured on reception on TrCHs then does not depend on the TFC in use. A sufficient RM adjustment time window will be usable and the UTRAN will just need to modify the reference TFC RM parameters to adjust the quality on all TrCHs and for all TFCs of the TFCS. This solution is proposed to reduce the volume of signaling needed between the UTRAN and the UE and facilitate the RM parameters adjustment. It will be understood that any TFC could be used as a reference, provided the emitting and the receiving entities have agreed upon beforehand (through signaling together with RM parameter-adapted values for instance). The reference TFC could be changed during the course of the call/session. For instance, setting the most frequently used TFC in a group as a reference is an advantageous solution. During the course of the session the UE is to adapt all $RM_{ij}$ parameters, $RM_{ij}$ denoting the dynamic RM parameter corresponding to TrCH i when using TFC j, in order to maintain the adequate ratios between $RM_{ij}$ parameters with a convenient rule to maintain the quality of transmission. The ratios between $RM_{ij}$ are pre-computed by UTRAN according to expected size gain at given BER and signaled at the beginning of a session.

This convenient rule to directly derive dynamic RM parameter values together with dynamic TFC choice is now explained. Following UTRAN adaptation of RM parameters of a reference TFC, RM parameters of any other TFC belonging to the same group should be adapted so that ratios between its RM parameters and those of the reference TFC are kept. Using this method, the new relative QoS balancing between TrCHs is done in an identical way whatever the TFC of the group. Initial inter-TFC scaling of RM parameters (allowing to benefit from size coding gain) is preserved.

For example, let us consider the case where two TrCHs are multiplexed. This will illustrate the utilization of the rule for two TFCs of the same group. TFC1 is supposed to be the reference TFC in the group. The $RM_{ij}$ parameters associated to each TrCH and for each TFC are the following before adaptation:

|  | TrCH0 | TrCH1 |
| --- | --- | --- |
| TFC0 | $RM_{00}$ | $RM_{10}$ |
| TFC1 (reference) | $RM_{01}$ | $RM_{11}$ |

The $RM_{ij}$ parameters associated to each TrCH and for each TFC are the following after adaptation and application of the rule:

|  | TrCH0 | TrCH1 |
| --- | --- | --- |
| TFC0 | $RM_{00}'$ | $RM_{10}'$ |
| TFC1 (reference) | $RM_{01}'$ | $RM_{11}'$ |

$RM_{01}'$ and $RM_{11}'$ are supposed to be adjusted using the optimization method described as the first object of the invention or any other RM parameter adaptation loop. Following this adaptation of RM parameters of this reference TFC, RM parameters of TFC0 belonging to the same group are adapted so that ratios between its RM parameters and those of the reference TFC are kept. Hence without signaling need $RM_{00}'$ and $RM_{10}'$ are locally computed on both emitting and receiving side using the following formulas:

$$RM_{00}' = \left\lfloor RM_{01}' \frac{RM_{00}}{RM_{01}} \right\rfloor \text{ and } RM_{10}' = \left\lfloor RM_{11}' \frac{RM_{10}}{RM_{11}} \right\rfloor$$

where $\lfloor \; \rfloor$ means rounding to the nearest smaller integer.

As a result, the new relative QoS balancing between TrCHs is done in an identical way whatever the TFC of the group. Initial inter-TFC scaling of RM parameters (allowing to benefit from size coding gain) is preserved as illustrated by the ratio below:

$$\frac{\frac{RM_{10}'}{RM_{00}'}}{\frac{RM_{10}}{RM_{00}}} \approx \frac{\frac{RM_{11}'}{RM_{01}'}}{\frac{RM_{11}}{RM_{01}}}$$

Both methods described hereinbefore as the first and second object of the invention can advantageously be coupled for a powerful ARM method bringing an even better radio resource optimization as will now be explained.

Part (possibly all) of the proposed dynamic RM parameters, can be pre-computed or computed in real time in the intelligent part of the network (on the basis of measurements and service flow requirements at significant environment evolution time constant) for signaling to the emitting side. This is part of the first object of the invention. The remaining part can be directly derived from signaled RM information together with dynamic Transport Format Combination (TFC) choice at the TFC selection time period following a predefined rule, which is described in the second object of the invention. This predefined rule agreed beforehand between receiving and emitting sides allows the emitting side to dynamically choose RM parameters taking into account in particular the channel coding type and code block size. This allows to instantaneously closely approach the current optimal QoS balancing.

This method enhances the semi-static approach of transport, i.e. quality of transmission on transport channels is maintained until the radio environment condition evolution or cell load leads to modify the semi-static parameters of transport formats or reconfigure the radio layers. It still uses these following currently defined semi-static parameters: channel coding type, Transmission Time Interval and CRC length, but introduces a modified and accurate use of the RM parameters (semi-static signaling but dynamic RM parameter tuning) and permits faster convergence towards optimal resource sharing.

This approach is consistent with the outer loop power control operation (transport quality measurement on each transport channel and fast inner loop SIR target adjustment) despite TFC changes. The invention applies in general to any service multiplexing and permits to maximize the cell capacity when used with pertinent TFCS elaboration strategy.

While the first object of the invention deals with an adaptive rate matching loop, the second object of the invention allows to instantaneously set dynamic RM parameters values closer to optimal values following a predefined rule at the TTC selection time period. The signaled RM parameter values proposed by the adaptation loop allow to maintain optimal resource consumption and quality balancing in evolving radio environmental conditions by tracking exact Quality of Transmission targets (BERs/BLERs) of the different TrCHs and not only quality target of the most stringent TrCH which would result in a resource waste. This RM parameter adaptation is made jointly and timely with outer loop tracking inner loop SIR target, taking into account coarse grain information rates and global coding effects of multiplexed tributary schema. At a finer TFC selection timescale, real time dynamic RM parameter adjustment will permit fine grain resource gain and finer tuning in quality balancing by taking into account variable rates and block size effect on coding performances.

Quality measurements performed by UTRAN to adapt RM parameters are to be made:

on a TrCH basis and per group of TFCs connected with the same reference TFC, whatever the TFC used in the group, for the purpose of relative QoS balancing between TrCHs (through the adaptation of RM parameters of the reference TFC), per TrCH and per TFC, for the purpose of adaptation of ratios between RM parameters of each TrCH according to code block size coding gain.

It shall be noted that the invention is fully backward compatible with and complementary to the existing 3GPP procedures of closed loop power control and gain factor adjustment defined in the standard 3GPP Technical Specification 25.214, Physical Layer Procedures (FDD). The same reference TFCs as the one currently defined by 3GPP could be advantageously reused for the implementation of the invention. Gain factor adjustment using dynamic RM parameters allows adjusting $E_s/N_0$ on CCTrCH following dynamic TFC selection.

The drawings and their descriptions hereinbefore illustrate rather than limit the invention. It will be evident that there are numerous alternatives, which fall within the scope of the appended claims. In this respect, the following closing remarks are made. There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software, or both carries out a function.

Any reference sign in a claim should not be construed as limiting the claim. Use of the verb "to comprise" and its conjugations does not exclude the presence of elements or steps other than those stated in a claim. Use of the article "a" or "an" preceding an element or step does not exclude the presence of a plurality of such elements or steps.

The invention claimed is:

1. In a transmission system for transmitting simultaneously at a global transmission power, corresponding to a global quality factor on reception, a set of various multiplexed services having specific predetermined error rate requirements matching individual quality factors achievable with adequately adjusted current individual transmission powers, a method of resource optimization comprising:

a step of balancing said current individual transmission powers with respect to an estimate, for a given service, of a difference between the specific predetermined error rate requirement and a measured current error rate;

a step of determining from a reference performance curve estimates of the individual quality factors matching the corresponding specific predetermined error rate requirements, for deriving initial rate matching parameters and for transmitting said initial rate matching parameters to an emitting entity;

a step of transmitting said initial rate matching parameters from a receiving entity to an emitting entity;

a step of measuring the current error rates of given services and the corresponding global quality factor for deriving extrapolated updates of said reference performance curve;

a step of deriving from the extrapolated updates, intermediate global quality factor estimates and corresponding required individual quality factors matching the specific predetermined error rate requirements of said given services; and a step of adapting the rate matching parameters based on the required individual quality factors in response to a difference detected between the intermediate global quality factor estimates for any two services.

2. A method as claimed in claim 1, wherein the step of balancing the current individual transmission powers includes dynamically adapting rate matching parameters associated to the services, which are related to a number of bits to be repeated or punctured during transmission of said services.

3. A method as claimed in claim 2, wherein the transmission system comprises at least the emitting entity and the receiving entity enabled to communicate via said set of various multiplexed services, the method on the receiving side comprising:

a step of storing the current rate matching parameters in response to the current error rates meeting the specific predetermined error rate requirements for a common intermediate global quality factor estimate; and a step of looping back to the step of measuring current error rate and the corresponding global quality factor.

4. In a transmission system for transmitting simultaneously, at a global transmission power, a set of various multiplexed services comprising a set of transport data blocks of various predetermined sizes for transporting block-coded data on specific transport channels having specific predetermined error rate requirements associated to quality factors, which necessitate adequately adjusted current individual transmission powers, a method of resource optimization including:

a step of balancing said current individual transmission powers with respect to the predetermined sizes of said transport data blocks, wherein said step of balancing said current individual transmission powers includes a step of determining from a reference performance curve estimates of the individual quality factors matching the corresponding specific predetermined error rate requirements, for deriving initial rate matching parameters and for transmitting said initial rate matching parameters to an emitting entity;

a step of transmitting said initial rate matching parameters from a receiving entity to an emitting entity;

a step of measuring the current error rates of given services and the corresponding global quality factor for deriving extrapolated updates of said reference performance curve;

a step of deriving from the extrapolated updates, intermediate global quality factor estimates and corresponding required individual quality factors matching the specific predetermined error rate requirements of said given services; and a step of adapting the rate matching parameters based on the required individual quality factors in response to a difference detected between the intermediate global quality factor estimates for any two services.

5. A method as claimed in claim 4, wherein the step of balancing the current individual transmission powers includes a step of dynamically adapting at code block size change rate matching parameters associated to the services, which are related to a number of bits to be repeated or punctured during transmission of said services.

6. A method as claimed in claim 5, wherein the step of dynamically adapting at code block size change rate matching parameters associated to the services includes a preliminary step of determining groups within the set of transport data blocks, a same group comprising transport data blocks associated to quality factors, which may differ only within a predefined range, and a step of computing the rate matching parameters with respect to a predefined rule corresponding to the associated quality factor of the group.

7. A computer program product for a receiver computing a set of instructions, which when loaded into the receiver, causes the receiver to carry out the method as claimed in claim 1 or 4.

8. A computer program product as claimed in claim 7, further comprising additional instructions, which when loaded into the transmission system, causes the emitting entity and the receiving entity to communicate via said set of various multiplexed services, the additional instructions further causing:
   a step of storing the current rate matching parameters in response to the current error rates meeting the specific predetermined error rate requirements for a common intermediate global quality factor estimate; and
   a step of looping back to the step of measuring current error rate and the corresponding global quality factor.

9. A method as claimed in claim 4, wherein the transmission system comprises at least the emitting entity and the receiving entity enabled to communicate via said set of various multiplexed services, the method on the receiving side comprising:
   a step of storing the current rate matching parameters in response to the current error rates meeting the specific predetermined error rate requirements for a common intermediate global quality factor estimate; and
   a step of looping back to the step of measuring current error rate and the corresponding global quality factor.

10. A transmission system comprising an emitting entity and a receiving entity for transmitting simultaneously at a global transmission power a set of various multiplexed services having specific predetermined error rate requirements matching quality factors achievable with adequately adjusted current individual transmission powers, the transmission system comprising resource optimization means including:
   means of balancing said current individual transmission powers with respect to an estimate, for a given service, of a difference between said specific predetermined error rate requirement and a measured current error rate;
   means for determining from a reference performance curve estimates of the individual quality factors matching the corresponding specific predetermined error rate requirements, for deriving initial rate matching parameters and for transmitting said initial rate matching parameters to the emitting entity;
   means for transmitting said initial rate matching parameters to the emitting entity;
   means of measuring the current error rates of given services and the corresponding global quality factor for deriving extrapolated updates of said reference performance curve;
   means of deriving from the extrapolated updates, intermediate global quality factor estimates and corresponding required individual quality factors matching the specific predetermined error rate requirements of said given services; and
   means of adapting the rate matching parameters based on the required individual quality factors in response to a difference detected between the intermediate global quality factor estimates for any two services.

11. A transmission system as claimed in claim 10, wherein the transmission system comprises at least the emitting entity and the receiving entity enabled to communicate via said set of various multiplexed services, the transmission system comprising:
   means for storing the current rate matching parameters in response to the current error rates meeting the specific predetermined error rate requirements for a common intermediate global quality factor estimate; and
   means for looping back to the step of measuring current error rate and the corresponding global quality factor.

12. In a transmission system comprising an emitting entity and a receiving entity for transmitting simultaneously at a global transmission power a set of various multiplexed services having specific predetermined error rate requirements matching quality factors achievable with adequately adjusted current individual transmission powers, the receiving entity comprising resource optimization means including:
   means of balancing said current individual transmission powers with respect to an estimation, for a given service, of a difference between said specific predetermined error rate requirement and a measured current error rate;
   means for determining from a reference performance curve estimates of the individual quality factors matching the corresponding specific predetermined error rate requirements, for deriving initial rate matching parameters and for transmitting said initial rate matching parameters to the emitting entity;
   means for transmitting said initial rate matching parameters to the emitting entity,
   means of measuring the current error rates of given services and the corresponding global quality factor for deriving extrapolated updates of said reference performance curve;
   means of deriving from the extrapolated updates, intermediate global quality factor estimates and corresponding required individual quality factors matching the specific predetermined error rate requirements of said given services; and
   means of adapting the rate matching parameters based on the required individual quality factors in response to a difference detected between the intermediate global quality factor estimates for any two services.

13. A receiving entity as claimed in claim 12, the receiving entity enabled to communicate via said set of various multiplexed services, the receiving entity comprising:
   means for storing the current rate matching parameters in response to the current error rates meeting the specific predetermined error rate requirements for a common intermediate global quality factor estimate; and
   means for looping back to the step of measuring current error rate and the corresponding global quality factor.

* * * * *